3,198,774
CONTINUOUS PROCESS FOR THE PREPARATION OF BLOCK COPOLYMERS
Robert L. Huxtable and Robert E. Dollinger, both of Bartlesville, Okla., assignors to Phillips Petroleum Company, a corporation of Delaware
No Drawing. Filed Nov. 14, 1961, Ser. No. 152,177
7 Claims. (Cl. 260—83.7)

This invention relates to the preparation of block copolymers. In accordance with one aspect, this invention relates to an improved process for the continuous production of block copolymers whereby gel formation is minimized.

It is known that various types of polymers can be prepared from different monomeric materials, the particular type formed being generally dependent upon the procedure followed in contacting the materials in the polymerization zone. For example, copolymers, such as a butadiene-styrene copolymer, can be prepared by the simultaneous reaction of the copolymerizable monomers. Another type of polymer can be obtained by following a procedure known as block polymerization. The polymers, usually referred to as block copolymers, are formed by polymerizing a monomer onto the end of a polymer, the monomer being introduced in such a manner that substantially all of the co-reacting molecules enter the polymer chain at this point. The particular method used in preparing the polymers has a great influence upon the properties of the product obtained. Thus, copolymers, graft copolymers and block copolymers differ greatly in their properties even though the weight per cent of each of the monomeric materials contained in the polymer may be the same in each case.

The present invention relates to an improved process for the production of block copolymers. It has been found that gel formation and reactor plugging due to gel formation are problems of great concern in the production of block copolymers in a continuous manner. The present invention minimizes and, in some instances, substantially eliminates gel formation in such a process.

An object of this invention is to provide an improved process for preparing block copolymers in a continuous manner.

Another object of this invention is to provide a process for minimizing gel formation in the continuous production of block copolymers.

A further object of this invention is to produce a gel-free block copolymer.

Other aspects, objects as well as the several advantages of the invention will become apparent to those skilled in the art upon a study of the disclosure and the appended claims.

According to the invention, in the continuous production of block copolymers the present invention resides in the improvement for minimizing gel formation which comprises carrying out the polymerization in the presence of an alkyl halide. It has been found that gel formation and reactor plugging due to gel formation can be substantially eliminated by carrying out the continuous polymerization of copolymerizable monomers under block copolymerization conditions in the presence of at least 0.1 mol of an alkyl halide per mol of polymerization initiator.

Alkyl halide compounds that can be employed according to the invention have from 1 to 12, inclusive, carbon atoms in the alkyl radical and the halogen can be selected from bromine, chlorine, fluorine, and iodine. Representative examples of suitable halides that can be employed according to the invention include methyl chloride, methyl bromide, ethyl iodide, isopropyl iodide, n-butyl bromide, n-amyl fluoride, n-hexyl iodide, n-heptyl chloride, isooctyl bromide, 2,4-diethyl hexyl chloride, decyl iodide, n-dodecyl chloride, and the like. Of the above halides, the n-alkyl bromides, especially n-butyl bromide, are preferred.

The amount of alkyl halide employed during polymerization can vary appreciably but generally the amount of halide employed ranges from 0.1 to 3 mols of halide per mol of initiator. However, the amount utilized will depend upon the activity of the halide compound employed. There is considerable variation in activity and in some instances too large a quantity of the halide destroys the initiator. In such cases only small amounts of halide should be used while in other cases satisfactory results can be obtained with larger amounts.

The polymers prepared by the instant process are to be distinguished from copolymers in that the final polymeric product is made up of blocks or segments. The invention is particularly applicable to a continuous process in which the polymer product is made up of blocks, each of which is a homopolymer of one of the monomers employed in the process. However, it is to be understood that the block copolymers of this invention can also include copolymer blocks and homopolymer blocks or only copolymer blocks. The polymers of the invention are generally prepared in the absence of a polar solvent since such solvents promote the formation of random copolymers.

Broadly speaking, the present invention is concerned with a process for preparing block polymers from monomers included in the following groups: (1) conjugated dienes having from 4 to 10 carbon atoms per molecule and vinyl-substituted aromatic hydrocarbons, (2) vinylpyridines, and (3) vinyl halides, vinylidine halides, acrylonitrile, esters of acrylic acid, and esters of homologues of acrylic acid.

Conjugated dienes which can be used in preparing the block copolymers of this invention include 1,3-butadiene, 2-methyl-1,3-butadiene (isoprene) and 1,3-pentadiene (piperylene). The vinyl-substituted aromatic hydrocarbons which can be employed in the practice of this invention can be any vinyl-substituted aromatic hydrocarbon. It is to be understood that a compound having a substituent on the alpha carbon atom, such as alpha-methylstyrene is not applicable to the practice of the instant invention. Examples of vinyl-substituted aromatic hydrocarbons which can be advantageously utilized include styrene, 1-vinylnaphthalene, 3-methylstyrene, and the like.

The term "vinylpyridines" as used herein is intended to designate pyridines containing a vinyl radical as the sole substituent. The vinyl-pyridines which can be employed include 2-vinylpyridine, 3-vinylpyridine, and 4-vinylpyridine. As indicated above, vinyl halides and vinylidine halides can also be used to the practice of this invention. Examples of suitable halides include vinyl chloride, vinyl bromide, vinylidine chloride, and the like. Esters of acrylic acid and esters of homologues of acrylic acid can also be employed in preparing the block polymers of this invention. Examples of such compounds include methyl methacrylate, ethyl acrylate, ethyl ethacrylate, methyl acrylate, ethyl methacrylate, methyl propacrylate, propyl acrylate, n-butyl acrylate, phenyl methacrylate, and the like.

The present polymerization is carried out in the presence of an organolithium initiator compound. The organolithium compound used as a catalyst in the process of this invention corresponds to the formula $R(Li)_x$, wherein R is a hydrocarbon radical selected from the group consisting of aliphatic, cycloaliphatic and aromatic radicals and X is an integer of from 1 to 4, inclusive. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithiobutene-2, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, and the like.

The amount of catalyst or initiator which is used in the preparation of the block copolymers of this invention can vary over a wide range. In general, at least 0.05 part by weight of the organolithium compound per 100 parts by weight of the total monomers to be polymerized is employed in the process. The upper limit for the amount of the organolithium compound to be used depends primarily upon the desired inherent viscosity of the polymer resulting from the polymerization. The inherent viscosity of the polymer produced decreases with increasing amounts of the organolithium compound. A preferred catalyst level is from 0.07 to 2 parts by weight of organolithium per 100 parts by weight of total monomers charged to the polymerization zone.

The organolithium initiators are generally prepared in polar solvents and ethers are ordinarily employed for this purpose. The ethers which are preferred include diethyl ether, ethyl methyl ether, diisopropyl ether, di-n-butyl ether, ethyl n-propyl ether, ethyl isobutyl ether, and the like. Other polar solvents such as thioethers and tertiary amines, for example, dimethyl sulfide, triethyl sulfide, triethylamine, tri-n-butylamine, and the like, can also be used. The polymerization process of this invention is preferably conducted in a hydrocarbon diluent in the substantial absence of a polar material such as an ether. It becomes necessary, therefore, to remove substantially all of the polar solvent employed in the preparation of the organolithium compound prior to its use in the process. This removal of the polar solvent can be accomplished in any suitable manner.

The process of this invention is ordinarily carried out in the presence of a hydrocarbon diluent selected from the group consisting of aromatic hydrocarbons, paraffins, and cycloparaffins. The preferred hydrocarbons of these types are those containing 3 to 12, inclusive, carbon atoms. Examples of suitable diluents which can be used include propane, isobutane, n-pentane, isooctane, n-dodecane, cyclopentane, cyclohexane, methylcyclohexane, benzene, toluene, xylene, naphthalene, and the like. It is to be understood that mixtures of two or more of these hydrocarbons can be used in the process.

The polymerization process of this invention can be carried out at a temperature within the range of 0 to 400° F. However, it is preferred to carry out the process at a temperature in the range of 120 to 250° F. The polymerization reaction can be carried out under autogenous pressures. It is usually desirable to operate at pressures sufficient to maintain the monomeric materials substantially in the liquid phase. The pressure will thus depend upon the particular materials being polymerized, the diluent being employed, and the temperature at which the polymerization is carried out. However, higher pressures can be employed if desired, these pressures being obtained by some such method as the pressurization of the reactor with a gas which is inert with respect to the polymerization reaction.

The process of this invention is preferably carried out as a continuous process by charging the polymerizable monomers and initiator simultaneously to the polymerization zone. The process of this invention can also be carried out semicontinuously by introducing additional charges of the monomer materials into the reactor after the initial charges have been at least partially polymerized. Any suitable type of apparatus adapted for continuous polymerization can be employed according to the invention. One suitable apparatus that can be employed comprises a tubular reactor wherein monomers, diluent, and initiator are continuously charged into the inlet end and polymer product is continuously withdrawn from the outlet end of the reactor. When employing a tubular reactor the reaction mixture is passed therethrough under streamline or plug flow conditions. In such a system, multipoint addition of monomers can be employed when desired. Also, when desired multipoint addition of a diluent to the reactor can be practiced for removing heat of reaction.

Various materials are known to be destructive to the organolithium catalyst of the invention. These materials include carbon dioxide, oxygen and water. It is highly desirable, therefore, that the monomers be free of these materials, as well as other materials which tend to inactivate the catalyst. Any of the known means for removing such contaminants can be used. Also, it is preferred that the diluent used in the process be substantially free of impurities such as water, oxygen, and the like.

After polymerization has been carried out to a desired degree, the initiator remaining in the reaction effluent can be deactivated by the addition of a material such as ethyl alcohol, isopropyl alcohol, or the like. The total effluent from the reaction zone including polymer, diluent, and initiator can be passed to a catalyst inactivating zone where the reactor effluent is cooled and contacted with a suitable initiator inactivating material. It is generally preferred to add only an amount of the catalyst deactivating material which is sufficient to deactivate the catalyst without causing precipitation of the dissolved polymer. It has also been found to be advantageous to add an antioxidant such as phenyl-beta-naphthylamine to the polymer solution prior to precipitation of the polymer. Alternatively, the reaction zone effluent can be first passed to a flash concentration zone to remove some solvent and then to a steam stripper to remove additional solvent and precipitate polymer. It is to be understood, however, that deactivation of the catalyst and precipitation of the polymer can be accomplished in a single step. The precipitated polymer can then be recovered by filtration, decantation, and the like.

The block copolymers which are produced according to this invention can be compounded by any of the known methods such as have been used in the past for compounding natural rubber. Vulcanization accelerators, reinforcing agents, and fillers, such as have been employed in natural rubber, can likewise be used in compounding the polymers of this invention. The polymers of the invention have utility in applications where both natural and synthetic rubbers are used. For example, they can be used in the manufacture of automobile tires, gaskets and other rubber articles.

A more comprehensive understanding of the invention can be obtained by referring to the following illustrative example which is not intended, however, to be unduly limitative of the invention.

*Specific example*

A butadiene-styrene block copolymer was prepared by contacting butadiene and styrene with n-butyllithium initiator in the presence of n-butyl bromide to prevent gel formation. A mol ratio of 1:1 of butylbromide to butyllithium was employed. The polymerization reaction was initiated at 210° F. and the run was continued for seven hours.

A tubular reactor was employed for this run. A solution of n-butyllithium in n-hexane containing the desired amount of n-butyl bromide was made up in a separate make-up tank. After the solution had been prepared it was pumped to the inlet of the tubular reactor. Additional solvent and a 75/25 weight percent mixture of butadiene-styrene was introduced into the initiator solution prior to introduction into the inlet end of the tubular reactor. The following charge rates were used during the run.

Initiator (with butyl
  bromide) _____ 0.018 lb./min. (0.66 weight percent butyllithium in n-hexane).
Monomer _____ 0.05 lb./min. (75/25 by weight butadiene/styrene).
Solvent _____ 0.75 lb./min. n-hexane.

The polymerization reaction was carried out for seven hours with only slight gel formation or build-up in the system. The block copolymer recovered contained 13.8 weight percent block styrene. It was found that the bound styrene content was 22.6 weight percent.

For comparative purposes a similar run was carried out with the same tubular reactor, as used in the above example, the only difference being the polymerization was carried out without the addition of an alkyl halide, especially n-butyl bromide. In this run the following feed charge rates were employed.

Initiator _____ 0.02 lb./min. (0.6 weight percent butyllithium in cyclohexane).
Monomer _____ 0.05 lb./min. (75/25 by wt. butadiene/styrene).
Solvent (cyclohexane) _ 0.75 lb./min.

The polymerization reaction in this run was initiated at 170° F. and after 2¼ hours of polymerization the reactor plugged with considerable buildup of gel in the system. It was necessary to stop the run and clean out the system before polymerization could be continued.

The rubber produced during this run contained 9.2 weight percent bound styrene and 2.4 weight percent block styrene.

It will be evident to those skilled in the art that many variations and modifications can be practiced upon consideration of the foregoing disclosure. Such variations and modifications are believed to be within the spirit and scope of the present invention.

We claim:

1. In a continuous process for the production of block copolymers wherein a conjugated diene having from 4 to 10 carbon atoms per molecule and a vinyl-substituted aromatic compound is continuously contacted with an initiator consisting essentially of an organolithium initiator having the formula $R(Li)_x$, wherein R is a hydrocarbon radical selected from the group consisting of aliphatic, cycloaliphatic, and aromatic radicals and X is an integer of 1 to 4, inclusive, in a hydrocarbon diluent under polymerization conditions to produce a block copolymer of said diene and said vinyl-substituted aromatic compound, and recovering the block copolymer so produced, the improvement for substantially preventing the formation of gel during said polymerization which comprises carrying out said contacting in the presence of at least 0.1 mol of an alkyl halide per mol of initiator, said alkyl halide having from 1 to 12, inclusive, carbon atoms per molecule.

2. A process according to claim 1 wherein the amount of said halide present ranges from 0.1 to 3 mols of halide compound per mol of organolithium compound and the amount of organolithium compound ranges from 0.07 to 2 parts by weight per 100 parts by weight of total monomers charged to the polymerization.

3. A process according to claim 1 wherein said halide is an alkyl bromide compound.

4. An improved polymerization process for minimizing gel formation in the production of block copolymers which comprises continuously introducing into a polymerization zone a reaction mixture of (a) 1,3-butadiene and styrene, (b) a hydrocarbon diluent selected from the group consisting of paraffins, cycloparaffins and aromatic hydrocarbons having from 3 to 12 carbon atoms per molecule, (c) 0.07 to 2 parts per 100 weight parts of total monomers of an initiator consisting essentially of an organolithium initiator having the formula $R(Li)_x$, wherein R is a hydrocarbon radical selected from the group consisting of aliphatic, cycloaliphatic and aromatic radicals containing up to and including 20 carbon atoms per radical, and X is an integer from 1 to 4, inclusive, and (d) 0.1 to 3 mols of an alkyl halide compound per mol of initiator, said halide having from 1 to 12, inclusive, carbon atoms per molecule, continuously contacting said reaction mixture within said zone at a temperature within the range 0 to 300° F. and under liquid phase conditions to form said copolymer, and continuously withdrawing from said zone said block copolymer as a product of the process.

5. Process according to claim 4 wherein said alkyl halide is an alkyl bromide compound.

6. Process according to claim 5 wherein said halide is n-butyl bromide.

7. Process according to claim 4 wherein said initiator is n-butyllithium.

References Cited by the Examiner

UNITED STATES PATENTS

| | | | |
|---|---|---|---|
| 2,886,561 | 5/59 | Reynolds | 260—94.9 |
| 3,030,346 | 4/62 | Cooper | 260—83.7 |
| 3,082,264 | 3/63 | West et al. | 260—94.9 |

JOSEPH L. SCHOFER, *Primary Examiner.*

WILLIAM H. SHORT, *Examiner.*